United States Patent [19]

Holmes

[11] Patent Number: 4,656,771

[45] Date of Patent: Apr. 14, 1987

[54] CARRYING ARRANGEMENT FOR DECOYS AND OTHER OBJECTS

[76] Inventor: Joseph G. Holmes, 209 Highland Ave., Piedmont, Calif. 94611

[21] Appl. No.: 792,461

[22] Filed: Oct. 29, 1985

[51] Int. Cl.$^4$ ............................................. A01M 31/06
[52] U.S. Cl. ........................................ 43/3; 294/158; 294/166
[58] Field of Search ...................... 43/3, 2, 1; 294/158, 294/165, 166, 137

[56] References Cited

U.S. PATENT DOCUMENTS

| 253,501 | 2/1882 | Bourne | 294/166 |
| 280,434 | 7/1883 | Zahm | 294/158 |
| 2,460,128 | 1/1949 | Greenleaf | 43/3 |
| 2,813,363 | 11/1957 | Leckner | 43/3 |
| 3,937,394 | 2/1976 | Netschert | 294/165 |

FOREIGN PATENT DOCUMENTS

| 249373 | 7/1912 | Fed. Rep. of Germany | 294/137 |
| 93785 | 3/1922 | Switzerland | 294/137 |

Primary Examiner—Gene P. Crosby
Attorney, Agent, or Firm—David Pressman

[57] ABSTRACT

A duck decoy or any other object (10) is made easy to pick up and carry, especially when being retrieved manually from cold water, by the present arrangement. An eyelet (12) is attached to its underside (or any other surface). A flexible line (16), such as a string, is passed through the eyelet. A weight or stop (20) is attached to one end of the line and a washer (18) or other annulus providing a loop is attached to the other end of the line. When the decoy is floating in water, the washer end of the line is at the eyelet and the weight extends down, away from the decoy. To retrieve the decoy from its floating position, it is manually grasped, lifted out of the water, and an elongated member (26) attached to a carrying handle (38) is passed through the washer. The decoy is then released, allowing it to fall to the weight at the other end of the line, whereby it will hang on the other end of the line from the elongated member and the washer, whereby it can be conveniently carried, along with a plurality of other decoys, by the elongated member with minimal manual handling.

17 Claims, 4 Drawing Figures

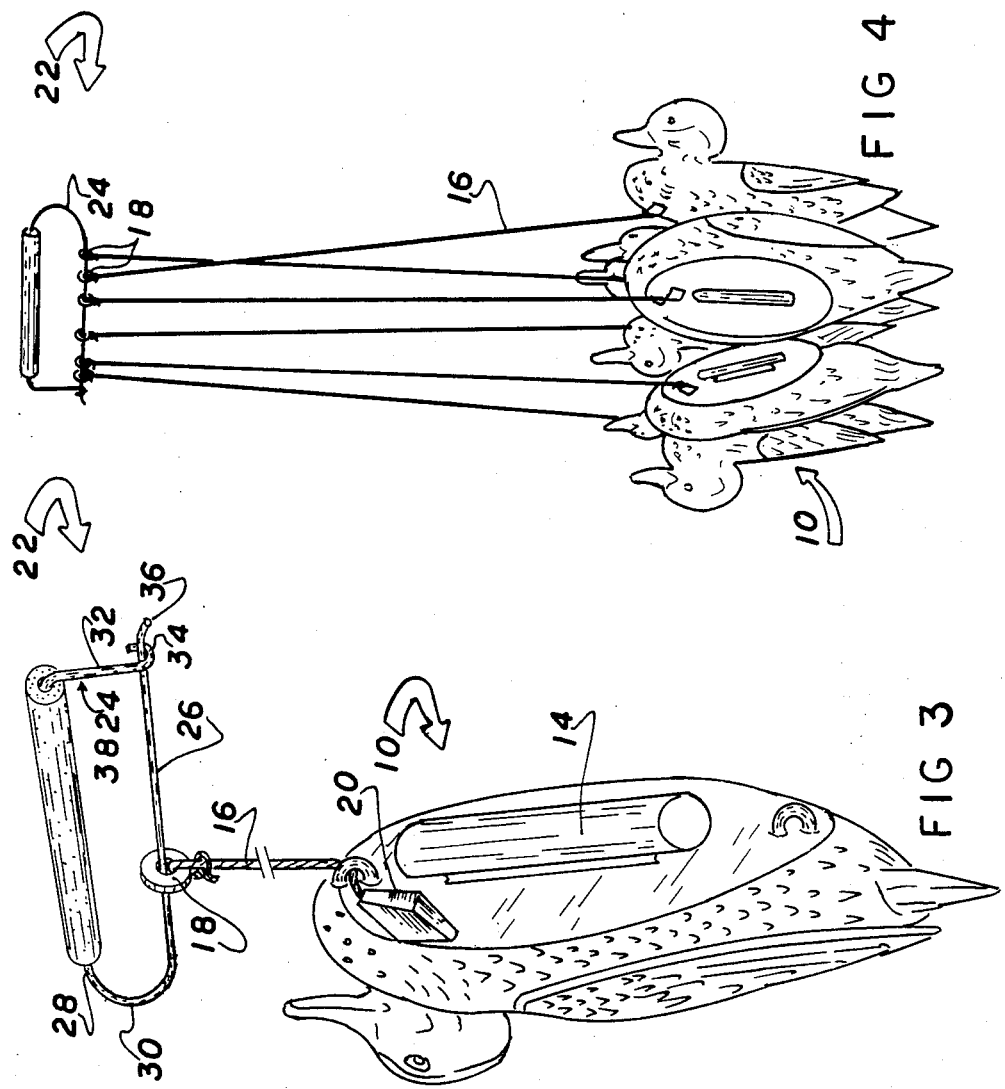

CARRYING ARRANGEMENT FOR DECOYS AND OTHER OBJECTS

BACKGROUND

1. Field of Invention

This invention relates to carrying arrangements for objects, particularly to an arrangement for easily carrying and retrieving objects such as duck decoys.

2. Description of Prior Art

Heretofore the retrieval and carrying of various objects of moderately large volume was difficult and awkward. For example, a typical duck decoy might measure from about 20 to 50 cm long and about 10 to 50 cm wide and high. In addition, it has an awkward, irregular shape which is difficult to grasp, stack, and carry. This problem is compounded when one must retrieve and carry several such decoys: due to their irregular shape, they can't be conveniently stacked or held in the arms of a person.

Heretofore decoys have had an integral or attached loop or eyelet on their underside. Commonly a line was strung through the loop to provide a means of attaching an anchor to the decoy. While at first blush it might appear that this line would make it easy to carry or retrieve the decoy, in actuality, the line made it very difficult to retrieve the decoy from a cold lake or pond. This is because the line hung below the decoy in the water, usually with an anchor weight on the end of the line distal from the decoy. As a result, the line became cold and wet, so that when the decoy was retrieved from the lake, the line came out dripping ice-cold water, making it difficult and awkward to handle the line without subjecting one's hands to chapping, frostbite, and without wetting and chilling one's clothes. This problem was compounded when one tried to store the line out of the way by wrapping it around the decoy: one had to handle the ice-cold, dripping line, a difficult task for even an experienced user. Further the problem became even more compounded when one had to carry and retrieve several decoys, especially when the decoys were large.

OBJECTS AND ADVANTAGES

Accordingly, one object and advantage of the invention is to provide an improved arrangement for carrying and retrieving objects manually, especially large, awkward objects, such as duck decoys. Other objects and advantages are to provide such an improved arrangement which can be used to retrieve objects from the water, especially cold water, without wetting oneself or one's clothes, to provide an arrangement for retrieving and carrying large, awkwardly-shaped objects, especially a large number of such objects, and to provide an arrangement for easily carrying and retrieving duck decoys which have an anchor line and weight attached to their underside. Further objects and advantages will become apparent from a consideration of the ensuing description and accompanying drawings.

DRAWING FIGURES

FIG. 3 is a bottom perspective view of the decoy and line suspended from the carrying clip.

FIG. 4 is a side view of a plurality of decoys suspended from the carrying clip.

Figure 1:
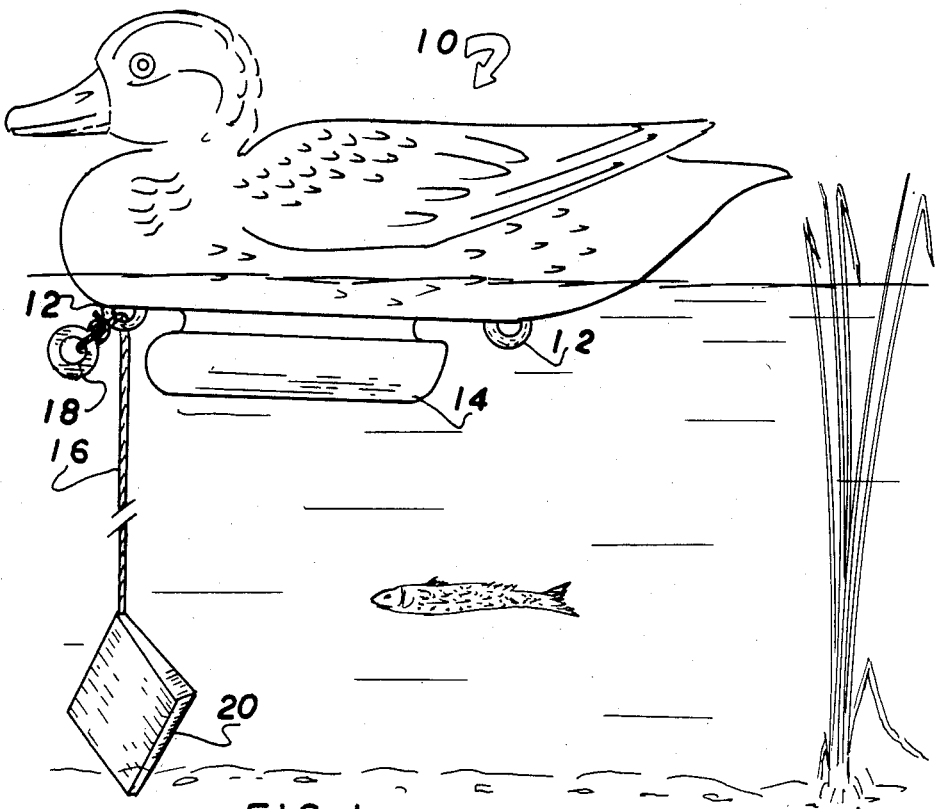
FIG. 1 is a side view of a floating duck decoy and attached anchor line and anchor weight according to the invention.

DRAWING REFERENCE NUMERALS 10 duck decoy
12 eyelet
14 keel
16 anchor/carrying line
18 annulus
20 anchor weight
22 carrying clip
24 wire
26 bottom side
28 top side
30 bight section
32 end section
34 hook
36 end extension of 26
38 sheath
40 direction line

DETAILED DESCRIPTION

As shown in FIG. 1, a duck decoy 10 has a plurality of integral or attached loops, rings, or eyelets 12 on its underside. Decoy 10 is usually made of plastic or wood, suitably painted, and eyelets 12 are integral or are made of brass or other water-impervious material. Decoy 10 includes an integral or attached keel 14 of conventional design for keeping the decoy upright and steadier in the water.

In accordance with the invention, an anchor and carrying line 16 of string or plastic, such as nylon or any other fishing line, is threaded through one of eyelets 12. One end of line 16 is tied to an annular member (annulus), such as a brass washer 18, while the other end of line 16 is attached to an anchor weight 20.

Weight 20 may be a conventional anchor weight and may be made of lead; it serves to keep decoy 10 in position, either by resting on the bottom of the lake or pond, by becoming entangled in water plants or grass, or merely by its inherent drag effect. Preferably line 16 is made long enough to enable weight 20 to reach the bottom of the lake or pond where the decoy is placed. In lieu of a weight 20, any stop which prevents line 16 from being pulled out of eyelet 12 may be used.

In lieu of a brass washer, annulus 18 may be made of plastic, stainless steel, or the like. In lieu of an annulus, member 18 may be any device which forms a loop at the end of line 16, such as a loop tied from the line itself, or an annulus having a small eyelet or clip to which the line can be tied or attached.

For carrying and retrieving the decoys with their lines, a clip 22 (FIGS. 2 to 4) is provided in accordance with the invention. Clip 22 comprises a stiff wire (brass, stainless steel, aluminum, or plastic) 24 bent in the shape of a generally-rectangular loop which has two major sides 26 and 28, a bight section 30 at one end, and a straight section 32 at the other end; straight end section 32 is removably connected to side 26 by means of a hook portion 34 at the end of 32 and a mating, curved-down extension part 36 of side 26. Side 28 of wire loop 24 is covered by a sheath or cylindrical tube 38 of wood, plastic, or rubber.

Wire 24 is dimensioned so that it can slip easily through annulus 18 and is made long enough so that a plurality of annului 18, as shown in FIG. 4, can be carried by side 26. E.g., annulus 18 may be 1 to 2 cm. in inside diameter, 2 to 4 cm. in outside diameter, and wire 24 may be 2 to 5 mm in diameter with side 26 about 10 to 25 cm. long and curved extension 34 about 5 to 20 mm long and bent down about 45°.

OPERATION

In operation, decoy 10 with line 16 threaded through one of its eyelets 12 and with loop 18 at one end and weight or stop 20 at the other end is merely placed in the water for use in conventional fashion, as shown in FIG. 1. Decoy 10 will float at the surface of the water and weight 20 will pull its end of line 16 down, causing annulus 18 and the other end of line 16 to stop or jam against eyelet 12 on the bottom of the decoy.

Figure 2:
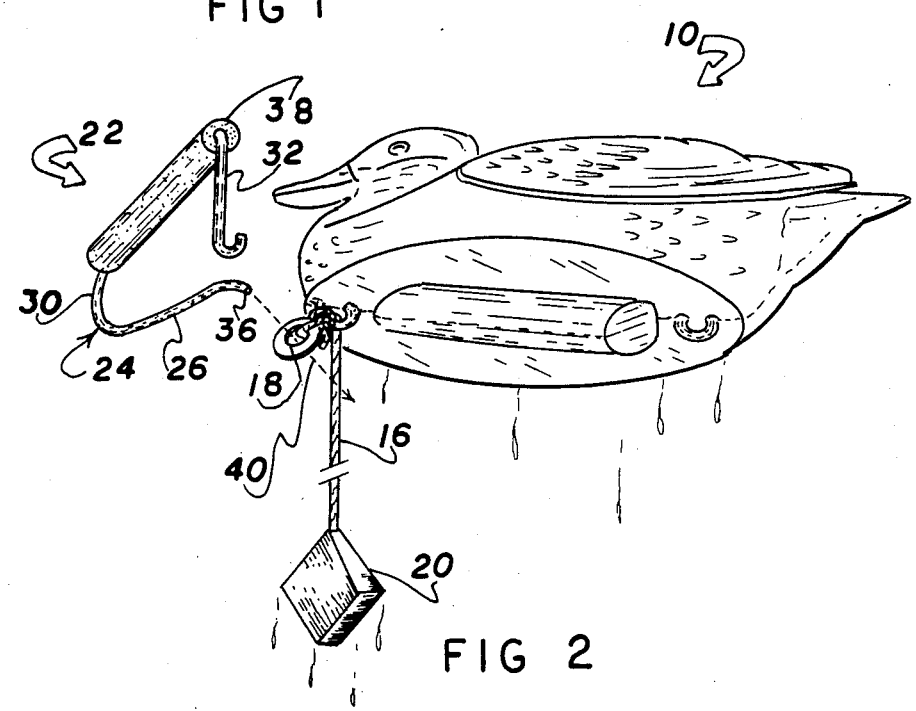
FIG. 2 is a bottom perspective view of the decoy and line, together with a carrying clip according to the invention.

When the user desires to retrieve decoy 10 from the water, he or she need merely lift the decoy out of the water, as shown in FIG. 2, whereupon line 16 will remain in position with weight 20 hanging down and annulus 18 pulled against eyelet 12 on the decoy. Clip 22 is opened, allowing side or section 26 to be free and clear of hook 34. Section 26 thus forms an elongated member with a free end 36. With decoy 10 held in one hand and clip 22 in the other, free end 36 is passed through annulus 18, in the manner indicated by broken line 40. This can be done quite easily without having to touch or handle dripping line 16 or any wet (underside) parts of decoy 10.

Then the user can close clip 22 (FIG. 3) and release decoy 10, allowing the decoy to fall to the end of line 16 with weight 20, as indicated in FIG. 3. Weight 20 will meet eyelet 12 on the decoy and thus will stop the decoy from passing off line 16 and falling away. The user then can conveniently carry the decoy by holding sheath 38 of the clip, which is dry and has low thermal conductivity. Thus the reader will see that the decoy has been retrieved and can be easily carried without having to handle any wet parts.

To retrieve and carry additional decoys, the process of the preceeding three paragraphs is merely repeated for as many additional decoys as can be carried on clip 22, e.g., up to 10 or more, as indicated in FIG. 4. The additional decoys can be retrieved and carried easily and conveniently, without ever having to handle any wet lines or touch any wet parts. Moreover many decoys can then be carrfed with one hand. Curved extension 36 of side 26 of the clip enhances the retention of side 26 in hook 34 when many decoys are carried or if the carried decoy(s) are subjected to increased downward forces, e.g., due to shaking or pulling of the decoys. I.e., if side 26 experiences high downward force, side 26 will bow downwardly, but will resist pulling or snapping out of hook 34 due to the fact that curved extension 34 will hang onto hook 34.

SUMMARY, RAMIFICATIONS, AND SCOPE

Accordingly it is seen that, according to the invention, an arrangement for retrieving and carrying decoys or other objects is provided which is convenient, economical, easy to use, and which can be implemented without having to handle or touch any wet or chilling parts. A plurality of decoys or other objects can be easily and safely carried with one hand.

While the above description contains many specificities, these should not be construed as limitations on the scope of the invention, but as exemplifications of the presently-preferred embodiments thereof. Many other ramifications and variations are possible within the teachings of the invention. For example, objects other than decoys can be carried or retrieved according to the invention. The clip shown can assume other shapes. Annulus 18 can also assume other shapes. The weight or stop on the line can be affixed thereto at a place other than the end of the line, as can the annulus. The clip can be used for other purposes, e.g., to carry objects other than decoys. Thus the scope of the invention should be determined by the appended claims and their legal equivalents, and not by the examples given.

I claim:

1. In combination:
    a decoy object,
    an eyelet attached to an outside surface of said object, and
    a flexible line threaded through said eyelet,
    one part of said line, on one side of said eyelet, having a stop attached thereto, said stop sized to prevent said one part of said line from passing through said eyelet,
    one other part of said line, on the other side of said eyelet, having means forming a loop thereat for preventing said other part of said line from passing through said eyelet and for enabling said line, with said object and stop attached thereto, to be picked up by an elongated member which can be extended through said loop.

2. The combination of claim 1 wherein said object is a duck decoy.

3. The combination of claim 2 wherein said duck decoy is floatable and said stop is an anchor.

4. The combination of claim 1 wherein said means forming a loop is an annulus attached to the end of said line.

5. The combination of claim 4 wherein said line is tied to said annulus.

6. The combination of claim 5 wherein said annulus is a washer.

7. The combination of claim 4 wherein said object is a duck decoy.

8. The combination of claim 7 wherein said duck decoy is floatable and said stop is an anchor weight.

9. The combination of claim 8 wherein said anchor weight and said annulus are attached to opposite ends of said line.

10. The combination of claim 1, further including a carrying clip, said carrying clip including said elongated member, said elongated member being free-ended so that it can be passed through said loop.

11. The combination of claim 10 wherein said carrying clip comprises a handle part and means for locking said loop onto said elongated member.

12. The combination of claim 11 wherein said clip is formed of a loop of wire having a generally rectangular shape and two free ends which can be joined together at one corner of the rectangle.

13. The combination of claim 12 wherein one of said two free ends of said loop of wire is bent into the shape of a hook and the other extends beyond said hook when it is nestled in said hook, the extending portion being bent away from said hook to increase the retentivity of said other free end in said hook.

14. A duck decoy retrieving and carrying arrangement comprising, in combination:
    a floatable duck decoy,
    said decoy having an eyelet attached to an underside surface thereof,
    a flexible line threaded through said eyelet, a stop being attached to one end of said line, on one side of said eyelet, said stop being sized to so that it cannot pass through said eyelet, an annulus attached to the other end of said line, on the other side of said eyelet, said annulus sized so that it cannot pass through said eyelet and for enabling said line, with said decoy and stop attached thereto, to be picked up by an elongated member which can be extended through said annulus.

15. The combination of claim 14, further including a carrying clip, said carrying clip including said elongated member, said elongated member being free-ended so that it can be passed through said annulus, said carrying clip comprising a handle part and means for locking said annulus onto the free end of said elongated member.

16. The combination of claim 15 wherein said clip is formed of a loop of wire having a generally rectangular shape and two free ends which can be joined together at one corner of the rectangle.

17. The combination of claim 16 wherein one of said two free ends is bent into the shape of a hook and the other extends beyond said hook when it is nestled in said hook, the extending portion being bent away from said hook to increase the retentivity of said other free end in said hook.

* * * * *